United States Patent
Theinert (10) Patent No.: US 11,036,394 B2
(45) Date of Patent: Jun. 15, 2021

(54) DATA DEDUPLICATION CACHE COMPRISING SOLID STATE DRIVE STORAGE AND THE LIKE

(71) Applicant: FalconStor, Inc., Melville, NY (US)

(72) Inventor: Denis Theinert, Germering (DE)

(73) Assignee: FALCONSTOR, INC., Austin, TX (US)

( * ) Notice: Subject to any disclaimer, the term of this patent is extended or adjusted under 35 U.S.C. 154(b) by 63 days.

(21) Appl. No.: 15/406,198

(22) Filed: Jan. 13, 2017

(65) Prior Publication Data

US 2017/0206022 A1 Jul. 20, 2017

Related U.S. Application Data

(60) Provisional application No. 62/279,283, filed on Jan. 15, 2016.

(51) Int. Cl.
*G06F 3/06* (2006.01)

(52) U.S. Cl.
CPC .......... *G06F 3/0608* (2013.01); *G06F 3/0611* (2013.01); *G06F 3/0641* (2013.01); *G06F 3/0649* (2013.01); *G06F 3/0685* (2013.01)

(58) Field of Classification Search
CPC .... G06F 3/0608; G06F 3/0611; G06F 3/0641; G06F 3/0649; G06F 3/0685
See application file for complete search history.

(56) References Cited

U.S. PATENT DOCUMENTS

| | | |
|---|---|---|
| 6,513,051 B1 | 1/2003 | Bolosky et al. |
| 7,055,008 B2 | 5/2006 | Niles et al. |
| 7,092,956 B2 | 8/2006 | Ruediger |
| 7,165,145 B2 | 1/2007 | Lam |
| 7,603,529 B1 | 10/2009 | MacHardy et al. |
| 7,610,285 B1 | 10/2009 | Zoellner et al. |
| 7,765,160 B2 | 7/2010 | Niles et al. |
| 7,814,056 B2 | 10/2010 | McGrattan et al. |
| 7,822,939 B1 | 10/2010 | Veprinsky et al. |
| 7,865,873 B1 | 1/2011 | Zoellner et al. |
| 7,954,157 B2 | 5/2011 | Niles et al. |

(Continued)

OTHER PUBLICATIONS

Office Action dated Jan. 19, 2018 which issued in U.S. Appl. No. 14/532,952.

(Continued)

*Primary Examiner* — Aracelis Ruiz
(74) *Attorney, Agent, or Firm* — The Law Office of Brandon N. Sklar (57) ABSTRACT

Methods and systems for deduplicating data by a system having a first storage device and a second storage device to store deduplicated data are described, wherein data is retrievable from the first storage faster than data is retrievable from the second storage. The first storage may be an SSD device. Data is received data for deduplication and deduplicated. It is determined whether to store the received data in the first storage or the second storage, and the data is stored in the determined location. If the first storage is full, data may be moved to the second storage to make room for data to be stored in the first storage. One or more factors may be used to determine whether to store the received data in the first storage and which data to move out of the first storage, if necessary. Retrieval methods and systems are also described.

35 Claims, 5 Drawing Sheets

(56) References Cited

U.S. PATENT DOCUMENTS

| | | | |
|---|---|---|---|
| 7,962,499 B2 | 6/2011 | Lam | |
| 8,214,376 B1 | 7/2012 | Jordan et al. | |
| 8,280,854 B1* | 10/2012 | Emmert | G06F 16/185 |
| | | | 707/664 |
| 8,321,648 B2 | 11/2012 | Condict | |
| 8,370,315 B1 | 2/2013 | Efstathopoulos et al. | |
| 8,370,593 B2 | 2/2013 | Arakawa et al. | |
| 8,370,594 B2 | 2/2013 | Niles et al. | |
| 9,529,545 B1* | 12/2016 | Bono | G06F 3/0685 |
| 9,785,644 B2* | 10/2017 | Lam | G06F 16/1752 |
| 2005/0108486 A1 | 5/2005 | Sandorfi | |
| 2006/0218638 A1 | 9/2006 | Niles et al. | |
| 2007/0198659 A1 | 8/2007 | Lam | |
| 2009/0063795 A1 | 3/2009 | Yueh | |
| 2009/0132619 A1 | 5/2009 | Arakawa et al. | |
| 2009/0182789 A1 | 7/2009 | Sandorfi et al. | |
| 2009/0319585 A1 | 12/2009 | Gokhale | |
| 2010/0064166 A1 | 3/2010 | Dubnicki et al. | |
| 2010/0070725 A1 | 3/2010 | Prahlad et al. | |
| 2010/0274763 A1 | 10/2010 | Ingen et al. | |
| 2011/0093439 A1 | 4/2011 | Guo et al. | |
| 2011/0138154 A1 | 6/2011 | Tevis et al. | |
| 2011/0219106 A1 | 9/2011 | Wright | |
| 2011/0231367 A1 | 9/2011 | Niles et al. | |
| 2011/0246430 A1 | 10/2011 | Prahlad et al. | |
| 2011/0320865 A1 | 12/2011 | Jain et al. | |
| 2012/0089578 A1 | 4/2012 | Lam | |
| 2013/0046767 A1 | 2/2013 | Lee et al. | |
| 2013/0086006 A1* | 4/2013 | Colgrove | G06F 3/0608 |
| | | | 707/692 |
| 2013/0198459 A1 | 8/2013 | Joshi et al. | |
| 2013/0238850 A1 | 9/2013 | Lam | |
| 2014/0006362 A1* | 1/2014 | Noronha | G06F 3/0641 |
| | | | 707/692 |
| 2014/0115182 A1 | 4/2014 | Sabaa et al. | |
| 2014/0281123 A1 | 9/2014 | Weber | |
| 2015/0010143 A1* | 1/2015 | Yang | G06F 3/0659 |
| | | | 711/118 |
| 2015/0058568 A1* | 2/2015 | Fong | G06F 3/0685 |
| | | | 711/122 |
| 2015/0127621 A1 | 5/2015 | Kuo | |
| 2016/0253322 A1 | 9/2016 | Li | |

OTHER PUBLICATIONS

Office Action dated May 10, 2017 which issued in U.S. Appl. No. 14/532,952.

Office Action dated Dec. 13, 2016 which issued in U.S. Appl. No. 14/532,952.

Wu, Chin-Hsien et al., "A Data De-duplication Access Framework for Solid State Drives", Journal of Information Science and Engineering 28, (2012), pp. 941-954.

Kim, Jonghwa et al., "Deduplication in SSDs: Model and Quantitative Analysis", IEEE 978-1-4673-1747-4/12 (2013), 12 pages.

FalconStor Software, SAN Acceleration Using FalconStor® Network Storage Server (NSS) (2010), 2 pages.

Linux Samba Server Administration by Roderick W. Smith, http://techedu.cu.cc/linux/Sybex%20Linux%20Samba%20Server%20Administration%20(2001).pdf, Sybex, 2001, 365 pages.

OpenDedup, administration guide, http://web.archive.org/web/20100331180805/http://www.opendedup.org/index.php/administrators-guide, Mar. 31, 2010, 10 pages.

Single Instance Storage in Microsoft Windows Storage Server 2003 R2, A Solution for Managing Duplicate Files, May 2006, pp. 1-17.

File-interface Deduplication System (FDS) 100 Series Storage Appliances. Data deduplication eliminates tape at remote and branch offices. FalconStor® 2011. Available at http://www.falconstor.com/dmdocuments/FDS-100Series_SS.pdf., 2 pages.

File-interface Deduplication System (FDS) High-performance network-attached data deduplication. FalconStor® 2011. Available atwww.falconstor.com/dmdocuments/FDS_Overview.pdf, pp. 1-4.

White Paper. Demystifying Data Deduplication: Choosing the Best Solution, FalconStor® 2009. Available at http://www.falconstor.com/library/documents/white-papers, pp. 1-4.

A White Paper. How Data Deduplication Works. FalconStor® 2010. Available at http://www.falconstor.com/library/documents/white-papers, pp. 1-4.

* cited by examiner

| Hash Value 202 | Location(s) On Client 204 | Location(s) On Dedup System 206 | Metadata 208 |
|---|---|---|---|
| . | . | . | . |
| . | . | . | . |
| . | . | . | . |
| . | . | . | . |

DATA DEDUPLICATION CACHE COMPRISING SOLID STATE DRIVE STORAGE AND THE LIKE

RELATED APPLICATION

The present invention claims the benefit of U.S. Provisional Patent Application No. 62/279,283, which was filed on Jan. 15, 2016, is assigned to the assignee of the present invention, and is incorporated by reference herein.

FIELD OF THE INVENTION

Data deduplication systems and methods and, more particularly, deduplication systems and methods including a deduplication cache comprising fast storage, such as solid state drive ("SSD") storage, for example.

BACKGROUND OF THE INVENTION

Data deduplication reduces storage requirements of a system by removing redundant data, while preserving the appearance and the presentation of the original data. For example, two or more identical copies of the same document may appear in storage in a computer and may be identified by unrelated names. Normally, storage is required for each document. Through data deduplication, the redundant data in storage is identified and removed, freeing storage space for other data. Where multiple copies of the same data are stored, the reduction of used storage may become significant. Portions of documents or files that are identical to portions of other documents or files may also be deduplicated, resulting in additional storage reduction.

To implement data deduplication, in one example data blocks are hashed, resulting in hash values, also referred to as message digests, that are smaller than the original blocks of data and that uniquely represent the respective data blocks. Substantially collision free algorithms, such as 20 byte SHA-1 hash or MD5 hash algorithms, may be used, for example. Blocks with the same hash value are identified and only one copy of that data block is stored. Pointers to all the original locations of the blocks with the same data are stored in a table, in association with the hash value of the blocks. A stub file may be created on the client machine to replace the deduplicated value. A pointer may be provided in the stub file on the client machine to associate the stored data block on the deduplication system with the location or locations of the discarded data block or blocks on the client machine. The stub file may contain the hash, which may also be used to locate deduplicated data in the deduplication system.

A remote deduplication system may be provided to perform deduplication of other machines, such as client machines, and storing deduplicated data, the deduplication system may provide a standard network file interface, such as Network File System ("NSF") or Common Internet File System ("CIFS"), to the other machines. Data input to the deduplication system by the client machines is analyzed for data block redundancy. Storage space on or associated with the deduplication system is then allocated by the device to only the unique data blocks that are not already stored on or by the device. Redundant data blocks (those having a hash value that is the same as a data block that is already stored, for example) are discarded. This process can be dynamic, where deduplication is conducted while the data is arriving at the deduplication system, or delayed, where the arriving data is temporarily stored and then analyzed and deduplicated by the deduplication system. In one example, the data set is transmitted by the client machine storing the data to be deduplicated to the deduplication system before the redundancy can be removed. The client machine may mount network shared storage ("network share") of the deduplication system to transmit the data. Data is transmitted to the deduplication system via the NFS, CIFS, or other protocol providing the transport and interface.

In another example, the deduplication system mounts network shared storage of the client machine to access the data to be deduplicated, as described in U.S. Patent Publication No. 2012/0089578, which is assigned to the assignee of the present invention and is incorporated by reference herein. Mounting the network stored storage of the client machine by the deduplication system avoids the need to transfer large amounts of data across a network, saving network bandwidth. An external data mover is not required.

The deduplication process is transparent to the client machines that are putting the data into the storage system. The users of the client machines do not, therefore, require special or specific knowledge of the working of the deduplication system.

When a user on a client machine accesses a document or other data from the client machine, the data will be looked up in the deduplication system according to index information, based on the pointer or hash in the stub file, for example. The stored data is returned to the user transparently, via NSF or CIFS, or other network protocols, by the deduplication system.

SUMMARY OF THE INVENTION

While tape storage may be read sequentially at a high rate, searching tape libraries for a particular data may be slow. Retrieval of deduplicated data blocks from tape storage may also therefore be slow.

In accordance with embodiments of the invention, methods and systems are provided for storing deduplicated data that is more likely to be needed in fast storage cache that is faster than other storage available on the system. In this way, the data stored in the fast storage cache may be more rapidly retrieved than data stored in other storage in the deduplication system. In one example, the fast storage cache (or "cache") may be non-spinning storage while the other storage is spinning storage. The fast storage cache may be a solid state drive ("SSD") storage, for example.

Data most likely to be needed may be data needed for read, write, and restore requests from client machines, for example. In one example, data that is considered to be more likely to be needed and therefore stored in the fast storage cache may be the data currently received by the deduplication system for deduplication. The determination that a data block is more likely to be needed may instead or in addition be based on other factors, such as a location of the data on the client machine. For example, a user may desire that data sent for deduplication that originates on a particular drive be stored in the cache for rapid retrieval, while data stored on other drives would not. Data that is stored in greater than a predetermined number of locations on the client machine may also be considered more likely to be needed. Data received from a particular client machine may also be prioritized for storage in the rapid storage. Other filters and/or a combination of filters may be used. An algorithm may be provided with weightings may be used by the deduplication system to determine whether to store received data in the cache.

Since the cache has a finite capacity, it may be necessary to move data out of the cache to make room for data that is more likely to be needed. In one example, the oldest data block stored in the cache is removed to make room for a new data. In another example, the data block that has been in the cache for the longest time without being requested is removed from the cache. Removal from the cache may also be based on the number of past requests for data blocks and/or the types of requests for data blocks, such as read, write, and/or restore requests. Probabilities that a respective data block may be requested may be determined based on past requests, for example, and the data block with the lowest probability of being requested may be moved. Data may also be removed based on a location of respective data blocks in the client machine providing the data of the data block for deduplication, a number of locations of the data on the client machine providing the data of the data block for deduplication, and/or an identity of the client machine providing the data of the data block for deduplication. Data may also be moved from the cache, or not, based on a number of times respective data has been received for deduplication from more than one client machine. The determination of which data to remove to make room for a newly deduplicated data block may be based on one or more of these or other factors. An algorithm may be used to balance two or more of these and other factors, to determine which data block to move out of the cache. The algorithm may include weightings of the different factors, for example.

DETAILED DESCRIPTION OF EMBODIMENTS

In accordance with embodiments of the invention, methods and systems are provided for storing in fast storage deduplicated data that is more likely to be needed, for rapid retrieval. In one example, the fast storage is solid state drive ("SSD") storage. In another example, the fast storage is storage that is faster than other storage available in the system. In one example, data considered to be more likely to be needed is data that has most recently been received by the deduplication system for deduplication. Other factors that may be taken into consideration in determining that received data is more likely to be needed and is to be stored in the fast storage are discussed herein. If the fast storage is full, a block of data may be removed from the fast storage to make room for the new data. The block of data removed may be the oldest block of data, for example. Other factors or a combination of factors may also be considered in determining which block of data to move out of the fast storage, as discussed herein. While receipt and deduplication of data blocks by the deduplication system is described below, the data received and deduplicated, and/or the data moved out of the fast storage if necessary, need not be in the form of data blocks.

Figure 1:
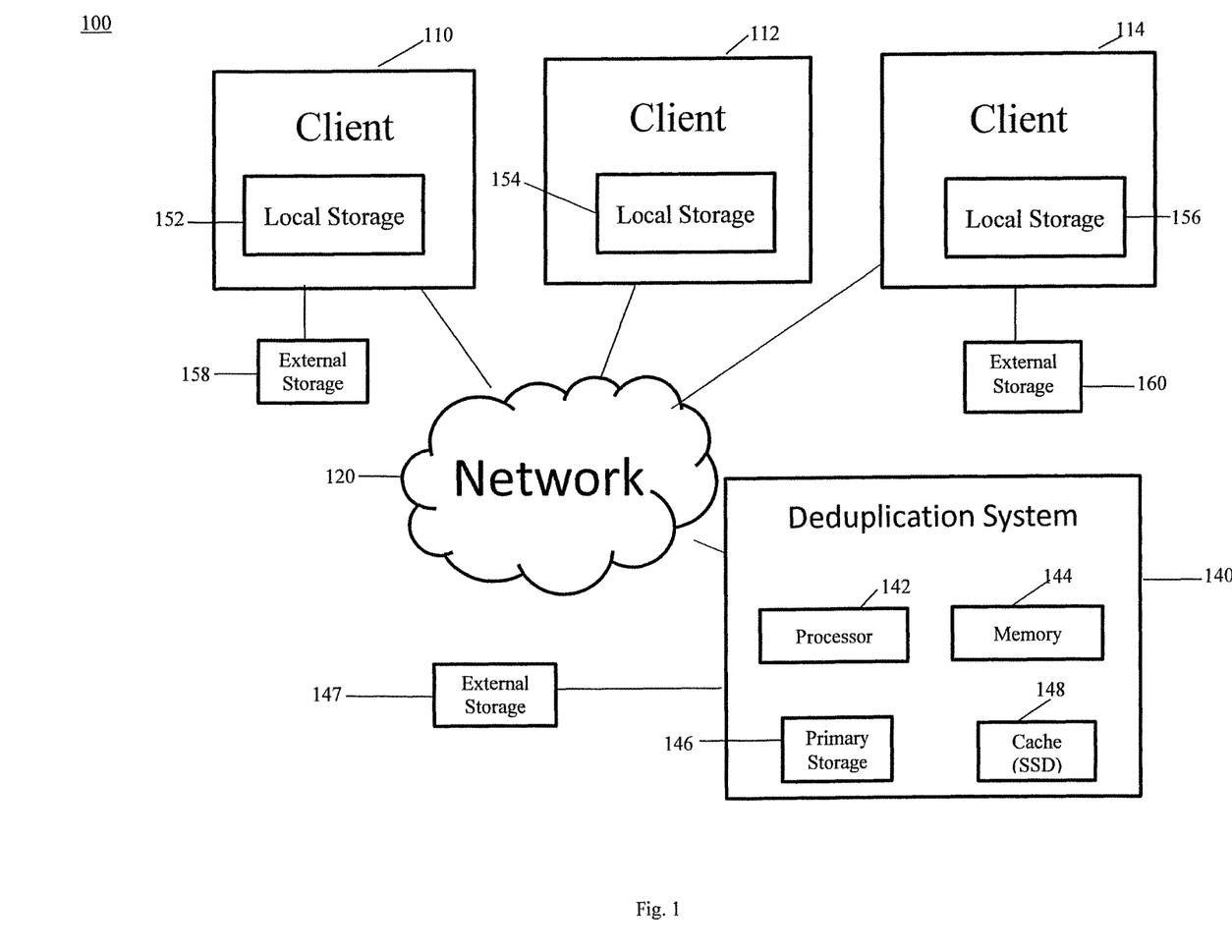
FIG. 1 is a block diagram of an example of a data processing environment in which deduplication is performed by a deduplication system, in accordance with an embodiment of the invention; for respective factors may be used to determine whether received data is to be stored in the cache.

FIG. 1 is a block diagram of an example of a data processing environment 100 in which deduplication may be performed by a deduplication system 140, in accordance with an embodiment of the invention. The system 100 comprises one or more client machines 110, 112, and 114, a network 120, and a deduplication system 140. While three client machines 110, 112, and 114 are shown in FIG. 1, more or fewer client machines may be included in the data processing environment 100.

Each client machine 110, 112, 114 may comprise hardware, software, or a combination of hardware and software. In one example, each client machine 110, 112, 114 comprises one or more computers or other devices, such as one or more personal computers (PCs), servers, and/or workstations. Alternatively, the one or more of the clients machines 110, 112, 114 may comprise a software application residing on a computer or other device.

To store data locally, the client machines 110, 112, 114 may also include local storage devices 152, 154, 156, respectively. The storage devices 152, 154, 156 may comprise any device that is capable of storing data, such as disk drives, tape drives, flash drives, and/or optical disks, etc. Alternatively, each client machine 110, 112, 114 may have access to a respective external storage device to store data. In this example, the client machines 110 and 114 have access to external storage 158 and 160, respectively. External storage may be provided instead of or along with the local storage 152, 154, 156.

The network 120 may comprise a single network or a number of different types of networks. The network 120 may be or include an intranet, a local area network (LAN), a wide area network (WAN), Fiber Channel storage area network (SAN), Ethernet, and/or the Internet, for example. Communications may be conducted over the network 120 by means of IP protocols and/or Fiber Channel protocols, such as NFS or CIFS for example.

In the example of FIG. 1, the deduplication system 140 comprises a processor 142, memory 144, and a primary storage device 146. The primary storage device 146 may comprise any device that is capable of storing data, such as a disk drive, tape drive, flash drive, and/or optical disk, etc. Alternatively or in addition, the deduplication system 140 may use an external storage device 147 and/or a storage device accessible over the network 120. The deduplication system 140 may also be configured as a system. The memory block 144 in FIG. 1 may represent RAM, ROM, and/or disk storage, for example.

The processor 142 may be a suitably programmed computer or other programmed processing device, for example. The processor 142 may comprise hardware configured to operate as described herein, such as hardware configured to operate under the control of software, and/or an application specific integrated circuit, for example. A combination of configured hardware and hardware operating under the control of software may also be used. Suitable software for controlling operation of the processor 142 may be stored in the memory 144, such as in ROM or on a disk, for example.

Figure 3:
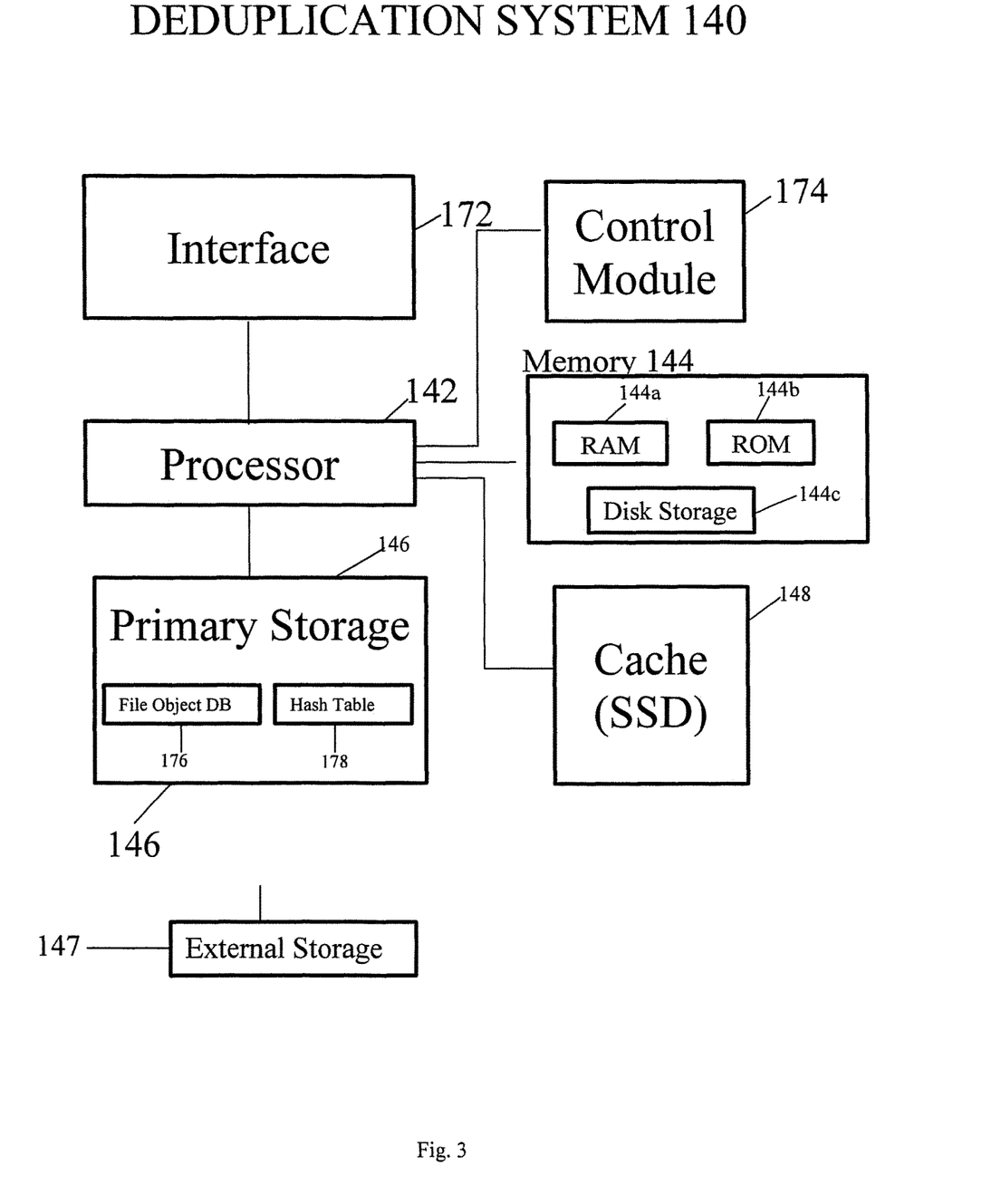
FIG. 3 is a more detailed block diagram of an exemplary deduplication system for use in the data processing environment of FIG. 1, in accordance with an embodiment of the invention.

In accordance with an embodiment of the invention, the deduplication system 140 includes or has access to a deduplication cache 148 that allows for more rapid retrieval of data stored than data can be retrieved from the primary storage 146 and external storage 147, if provided. The deduplication cache 148 may be any memory device that allows for more rapid retrieval of data then the primary storage device 146 and/or the external storage device 147. For example, where the primary/external storage devices 146/147 are spinning storage devices, such as disk drives, the cache 148 is a faster storage than the spinning storage, such as a non-spinning storage. The cache 148 may comprise solid state devices ("SSD"), for example. In FIG. 1, the deduplication cache 148 is part of the deduplication system 140. In other examples an external cache 148 is provided. Both external and internal caches 148 may be provided. FIG. 3, discussed below, is a more detailed block diagram of an example of a deduplication system 140.

The deduplication system 140 deduplicates data provided by the client machines 110-114 to the deduplication system 140 across the network 120, and/or accesses data located on the local storage devices 152, 154, 156, 158 and/or 160 via the network, to deduplicate the data. Data may be accessed by mounting network shared stored on any or all of the local storage 152, 154, 156 and/or the external storage 158, 160, for example, as described in U.S. Patent Publication No. 2012/0089576. The deduplicated data is stored in the storage device 142 and/or the external storage 147.

In accordance with embodiments of the invention, certain deduplicated data, such as data more likely to be requested for retrieval by the client machines 110, 112, 114, is selectively stored in, and preferentially maintained in, the deduplication cache 148 for faster retrieval. In one example, it is assumed that the data most likely to be requested is or comprises most recently received data for deduplication. In another example, it is assumed that the data most likely to be requested is or comprises most recently requested data, data requested more than a predetermined number of times since being stored in the cache, or data requested more than a predetermined number of times in a predetermined time period. Requested data may include data requested for restore, read, and/or write operations, for example. The data stored and maintained in the cache may also be based on the type of past requests. For example, a data block for which more than a predetermined number of read and/or write requests may be considered to be more likely to needed than data blocks subject to restore requests, or vice-a-versa.

In another example, data to be stored in the cache 148 and maintained in the cache may be or comprise data or data blocks stored in more than a predetermined number of locations on the client machine 110, 112, 114. For example, sub-files on client machines 110-114 may be reviewed to determine if a data block is stored in more than a predetermined number of locations. A hash table, such as the hash table 200, discussed below with respect to FIG. 2, may also be reviewed, instead of or along with reviewing sub-files, to determine whether a data block is stored more than the predetermined number of locations in a client machine. If the deduplicated data is stored on tape, common file headers may be reviewed to determine whether a respective data block is stored in more than a predetermined number of locations.

In another example, the data to be stored in the cache 148 is data from a storage location on a client device of a client machine 110, 112, 114 that is designated by the client, such as data stored on a particular drive, for example. The identity of the client machine may also be a factor.

Other filters and/or a combination of filters may be used to determine whether received data should be stored in the cache 148 and/or whether to move a data block out of the cache to make room for the currently received data. The processor 142, for example, can determine whether to store received data is stored in the cache 148 or primary storage 146, and whether to move data out of the cache 148 under the control of algorithms stored in the memory 144, for example, the algorithms may include weightings for two or more respective factors.

Data may be stored in the storage devices 152-160 of the client machines 110, 112, 114, in the form of data files, which may in turn be organized and grouped into folders. A folder is sometimes referred to as a "directory," and a directory within another directory is sometimes referred to as a "sub-directory." Alternatively, data may be stored using other data structures.

Deduplication functionality may be performed by any technique known in the art. In one example, the data is deduplicated by dividing the data stored on the storage devices 152-160 into data blocks, or segments of data, and processing the data blocks. The processor 142 of the deduplication system 140 reads each data block and computes a message digest or digital fingerprint, such as a hash value, of each data block. As is known in the art, message digests are smaller than the original respective data blocks and uniquely represent each data block.

In one example, the deduplication system 140 converts the files on the client machines 110, 112, 114 containing data that has been deduplicated ("deduplicated data") into stub files. The data or data blocks in respective files may be replaced with indicators to the locations of the deduplicated data files on the storage devices 146, 147, 148 by the deduplication system 140 directly or via an agent on the respective client machine 110-114, for example. Since the storage locations of the deduplicated data may be changed, however, as discussed herein, the indicator to the current location of the deduplicated data could need to be changed. Respective indicators may be changed, if needed, by the deduplication system 140 directly or via the agent on the respective client machine 110, 112, 114, for example. The current location of a respective deduplicated data file may be stored in a hash table, such as the hash table 200 discussed below with respect to FIG. 2, for example, instead of or in addition to the stub file. The current location of a respective deduplicated data file may also be found in a directory of a respective storage device 146, 147, 148, for example.

Alternatively or in addition, a hash value of the respective data may be placed in the stub files. The hash value may be used by the client machine to request the data corresponding to the deduplicated data file, as discussed further below. In either case, the original appearance (directory and file structure) of the data on the client machines 110, 112, 114 is preserved. Storage requirements are reduced and available storage space is increased on the storage devices 152, 154, 156, 158, 160 of the client machines 110, 112, 114. The indicators may be pointers, for example. If a client machine 110, 112, 114 uses a UNIX operating system, the pointers may be symbolic file links.

Hash values are generated by substantially collision free algorithms which generate a probabilistically unique hash value based on inputted data, as is known in the art. Examples of substantially collision free algorithms are the SHA-1 algorithm and the MD5 (message digest 5) algorithm. Either may be used, for example, as described in U.S. Pat. Nos. 7,055,008, 7,962,499, and U.S. Patent Application Publication No. 2007/0198659, which are assigned to the assignee of the present invention and are incorporated by reference herein. U.S. Pat. No. 7,954,157, which is also assigned to the assignee of the present invention and is incorporated by reference herein, describes examples other techniques that may also be used. Other substantially collision free algorithms may also be used.

Figure 2:
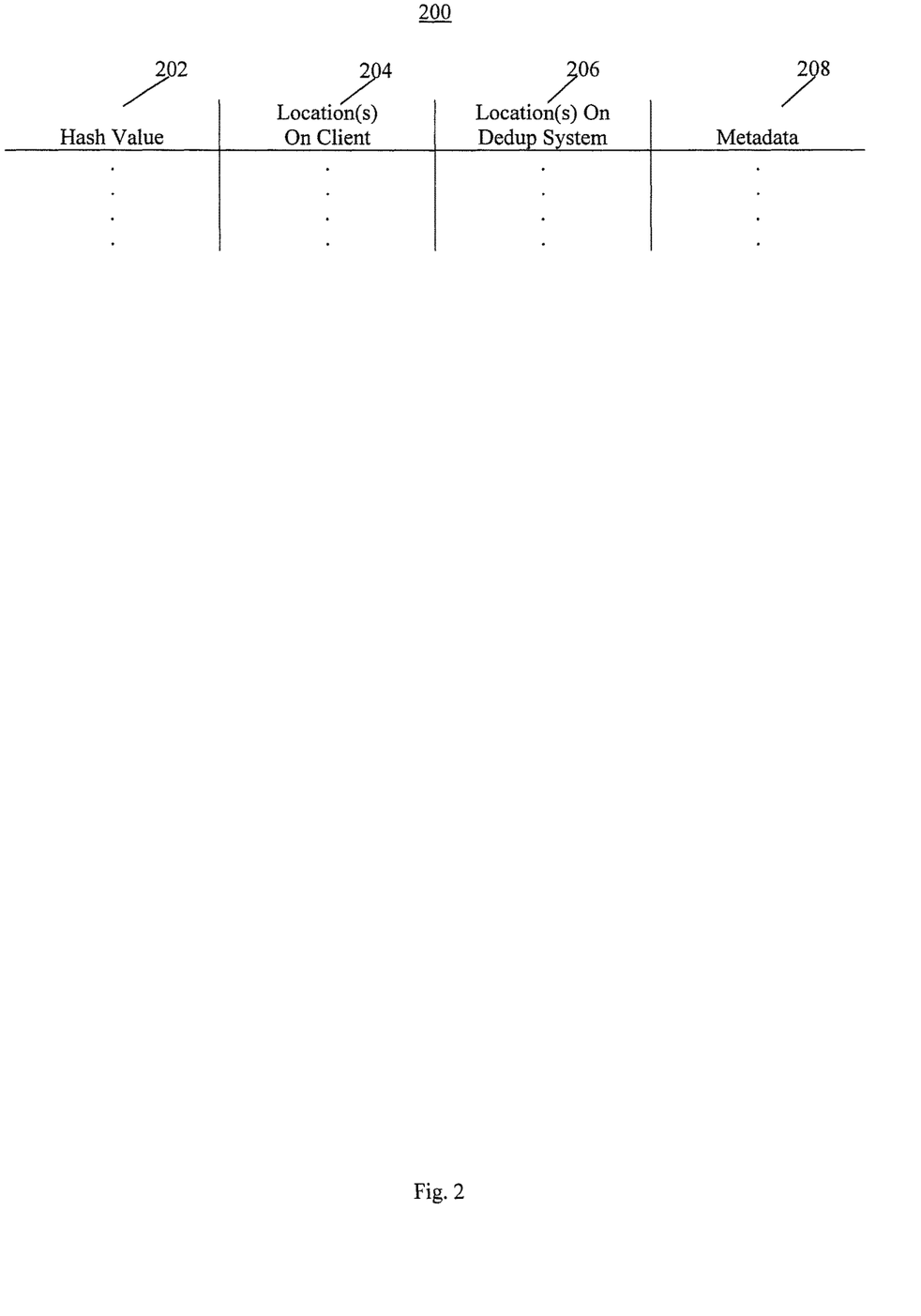
FIG. 2 is a schematic representation of a hash table.

The hash values may be stored in a database of hash values by the deduplication system 140, such as "hash" table 200. An example of a hash table 200 is shown in FIG. 2. The hash table 200 may be stored in the memory 144, the primary storage 146, and/or the external storage 147, or another memory/storage device. In the schematic representation of the hash table 200 FIG. 2, hash values 202, the one or more locations 204 on the client machine 110, 112, 114 where the corresponding data block was stored, and the one or more locations 206 on the memory 144, primary storage 146, external storage 147, and/or memory cache 148 of the deduplication system 140 where a respective data block is stored, for example, are correlated. The hash table 200 may also contain metadata 208 identifying when (date and optionally time) each data block corresponding to a respective hash value was stored in the hash table.

The column 204 including the location on the client machine 110, 112, 114 is optional. If the stub files on the client machines contain indicators to the location of the data in storage on or associated with the deduplication system 140, and the location of the data block is changed, the location 204 of the data block on the respective client machine 110-114 may be used to locate the stub file and change the indicator on the stub file to indicate the new location of the stub file. If indicators are not provided in the stub files, then the column 204 is not needed for this purpose. It may still be provided for housekeeping and other purposes.

When a new (unique) data block is added to the cache 148, the hash value of the data block is added to the hash table 200. The location 204 of the actual data block in the storage of the client machine 110, 112, 114 where the original data block came from is associated with the data block in the hash table 200. The hash table 200 may also record when a respective data block is stored or removed from the cache, in the metadata 208, for example. The cache 148 may also record where and when a respective data block is stored in the hash table 200. The primary storage 146 may similarly record when a data block is stored or removed from the primary storage.

If the hash value of a current data block being deduplicated matches a hash value already in the hash table 200, then the data block is not unique and has already been deduplicated and stored by the deduplication system 140. Another copy of the data block need not be stored on the deduplication system 140, saving storage space on the deduplication system 140 and network bandwidth, if it would have been necessary to transfer the data block across the network 140 to the deduplication system 140 for storage. Instead, the file on the client machine 110, 112, 114 containing the deduplicated data block may be replaced by a stub file containing a pointer or symbolic link to the location of the deduplicated data block stored in the storage of the deduplication system 140 and/or the hash value of the data block, as discussed above. In either case, since the stub file takes up less storage space than the original data file, storage space is freed for later use by the respective client machine 110, 112, 114. The hash table 200 may be updated to include the location on the respective client machine 110, 112, 114 where the current data block is located in column 204, for example, if such information is stored in the hash table.

The size of each data block may be fixed or variable, depending on the operating system or the system administrator's preferences. Fixed blocks are easier to manage, but may waste space. Variable sized blocks make a better use of the available backup space, but are somewhat more difficult to keep track of. In addition, the size of the blocks may vary from file to file. For instance, one option may be to have each file contain a set number of blocks, N. The size of each block from a larger file of size S1 would be S1/N and the size of each block from a smaller file of size S2 would be S2/N, where S1/N>S2/N. A special case of a variable-sized block is the whole file itself (where N=1, for example), however, it is likely more advantageous to have smaller-sized blocks in order to avoid having to save large files that change only slightly between backups. In addition, the size of the blocks may be limited by the requirements of the specific algorithm used to create the message digest.

FIG. 3 is a more detailed block diagram of an exemplary deduplication system 140 that may be used in the data processing system 100 of FIG. 1 to implement embodiments of the invention. The processor 142 primary storage 146, external storage 147, and memory cache 148 of FIG. 1 are shown. The memory 144 of FIG. 1 is shown including RAM 144a, ROM 144b, and disk storage 144c. Also shown are an interface 172 and a control module 174. The interface 172 provides a communication gateway through which data may be transmitted between the processor 142 and the network 120. The interface 404 may comprise any one or more of a number of different mechanisms, such as one or more SCSI cards, enterprise systems connection cards, fiber channel interfaces, modems, or network interfaces.

The processor 142 controls the operations of the deduplication system 140, including storing and accessing deduplicated data from the primary storage 146, storing data in and accessing data from the memory 144, and causing data to be retrieved and transmitted upon request to the client machines 110, 112, 114. In one example, the control module 174 directs the access and deduplication of data from the client machines 110, 112, 114, including management of the hash table 200. The processor 142 may perform these operations along with or instead of the control module 174. The memory 144 may comprise random-access memory (RAM), for example. The memory 144 may be used by the processor 142 to store data on a short-term basis. In this example, the deduplication system 140 comprises a computer, such as an Intel processor-based personal computer. The control module 174 may comprise software run by the processor 142 or may be a separate processing device. The control module 174 may also comprise an application specific integrated circuit, for example.

The primary storage 146 may comprise one or more disk drives, and/or any other appropriate device capable of storing data, such as tape drives, flash drives, optical disks, etc. The primary storage 146 may perform data storage operations at a block-level or at a file-level. The processor 142 and the primary storage 146 may be connected by one or more additional interface devices. In an alternative example, the primary storage 146 may comprise a storage system separate from the deduplication system 140. In this case, the primary storage 146 may comprise one or more disk drives, tape drives, flash drives, optical disks, etc., and may also comprise an intelligent component, including, for example, a processor, a storage management software application, etc.

The control module 174 may direct the receipt or access of data from the client machines 110, 112, 114 and cause the data to be deduplicated and stored in the primary storage device 142, external storage 147, and/or cache 148. To facilitate the storage of the deduplicated data blocks, the control module 174 may maintain one or more databases in the primary storage 146. For example, the control module 174 may create and maintain a file object database 176 in the primary storage 146. The file object database 176 may be maintained in the form of a file directory structure containing files and folders containing pointers to the locations in the deduplication system 140 of the data blocks in each file in the hash table 200, instead of or in addition to the data in column 206 of the hash table 200, for example. In addition, the file object database 176 may comprise a relational database or any other appropriate data structure of the data blocks stored on the primary storage 146. The directories, files, and folders may be based on the corresponding directories, files, and folders on the client machines 110, 112, 114 containing the data sent to the deduplication system 140. The control module 174 may also maintain the hash table 200. The processor 142 may be configured to provide any of these functions, instead of the control module 174.

The control module 174 and/or the processor 142 of the deduplication system 140 may cause data to be backed up in accordance with a schedule comprising one or more backup policies established by the respective client machines 110, 112, 114, for example. The backup policies may specify parameters including the storage device, directory, or file to be backed up; the backup time; and/or the backup frequency, etc., for each client machine 110, 112, 114. To enable a user to establish such backup policies, an agent may be provided by the deduplication system 140 to the client machines 110, 112, 114, via the network 120, for operation on the client machine, for example. The agent on each client machine 110, 112, 114 may generate a graphical user interface ("GUI") for use by each respective client machine to facilitate the initial setup and selection of parameters for the backup policy, and to transmit the policy to the deduplication system 140. The deduplication system 140 may further coordinate the prioritization, scheduling, and other aspects of one or more clients' respective backup policies. This enables efficient use of the resources of the deduplication system 140. The setting of backup policies are described in more detail in U.S. Patent Publication No. 2012/0089578, which is assigned to the assignee of the present application and is incorporated by reference herein.

The GUI on the client machines 110, 112, 114 may also be used by respective clients to designate which types of data from their client machine should be stored in the cache 148, such as the current data block provided for deduplication, data from one or more particular storage locations, and/or data appearing more than a predetermined number of times on the respective client machine. The client could also determine the predetermined number, for example. The GUI may also be used by the client to select the one or more factors to be used to determine which data blocks to move out of the cache if room is needed in the cache. Options may be presented to the client in a drop down menu, for example.

As discussed above, if the data block is found to be unique (the hash value is not already stored in the hash table 200) by the processor 142, then an identical data block has not already been received, hashed, deduplicated, and stored by the deduplication system 140. In accordance with an embodiment of the invention if there is room in the cache 148, the data block is then stored on the cache 148. If there is no room in the cache 148, then the oldest data block is removed from the cache 148 to make room for the new data block. In one example, data blocks are removed from the cache 148 in a first-in, first-out ("FIFO") manner in which the oldest data block (first-in) is removed (first-out) to make room for a new data block. In the hash table 200 of FIG. 2, the oldest data block in the cache 148 may be the lowest (oldest) data block in the hash table 200, but that is not necessarily the case. The associated metadata 208 associated with respective data blocks may indicate the date and optionally the time a hash value was stored, which may be used to determine the oldest data block in the cache 148, for example.

In another example, a modified FIFO method may be used, in which other factors are added to the FIFO method. This may be referred to as prioritized queuing. In one example of a modified FIFO method, a subsequently requested data block may be treated as a more recently added data block. For example, instead of selecting the oldest data block stored in the cache 148 for movement out of the cache to the primary storage 146 or other storage, the data block selected to be moved may be the oldest data block that has not been requested, or has less than a predetermined number of requests, since it has been stored in the cache or within a predetermined period of time. In one example, a count of requests may be kept for each data block which is incremented (or decremented) based on each request for the data block and/or other factors, for example. The count may be maintained in the metadata 208 in the hash table 200 or another table, for example, by the deduplication device 140. In one example, the control module 174 maintains the count. In another example the processor 142 maintains the count. The data block(s) with the lowest current count would have the lowest priority value and would then be moved to the slow storage such as the primary storage 146, when additional space is needed in the cache 148.

In another example, the data block with the lowest probability of being requested may be selected to be moved. The probability that respective data blocks will be requested may be determined by the processing device 140 and/or the control module 174 based on the number of requests for each data block since it has been stored in the cache 148, or within a predetermined period of time, for example. The count maintained in the metadata 208 the hash table 200, discussed above, may be used.

The types of requests (read, write, and/or restore) for respective data blocks, which may also be stored in the metadata 208, may be considered, with priority given to data blocks subject to a particular type of request.

Other factors that may be considered by the processing device 140 and/or the control module 174 in selecting a data block to move out of the cache 148 are the locations of respective data blocks in the client machine providing the data of the data block for deduplication and/or a number of locations of the data on the client machine providing the data of the data block for deduplication. The particular locations of data blocks on the client machines 110, 112, 114 and the number of locations the same data block is stored on the respective client machine 110, 112, 114 may be determined in a manners know in the art. For example, as discussed above, the locations of data blocks that have been deduplicated may be found in column 204 in the hash table 200. In another example, an agent on the respective client machine may be used to determine how many times a data block is stored on a client machine. In another example, the deduplication request sent by a client machine may include the location of the data block on the client machine. If the deduplicated data is stored on tape, common file headers may be reviewed to the number of times a respective data block is stored on the client machine.

The identity of the client machine 110, 112, 114 providing the data of the data block for deduplication may also be a factor in determining whether to store a received data block in the cache 174. The identity of the client machine may be provided in the request to deduplicate the data, for example and stored in the hash table 200 in the metadata 208, for example.

Another example of a factor is a number of times respective data blocks have been received from multiple client machines 110, 112 and/or 114. This is another indication of the importance of a data block to more than one client.

As noted above, different client machines 110, 112, 114 may request that different factors be given priority, via the GUI, for example.

Figure 4:
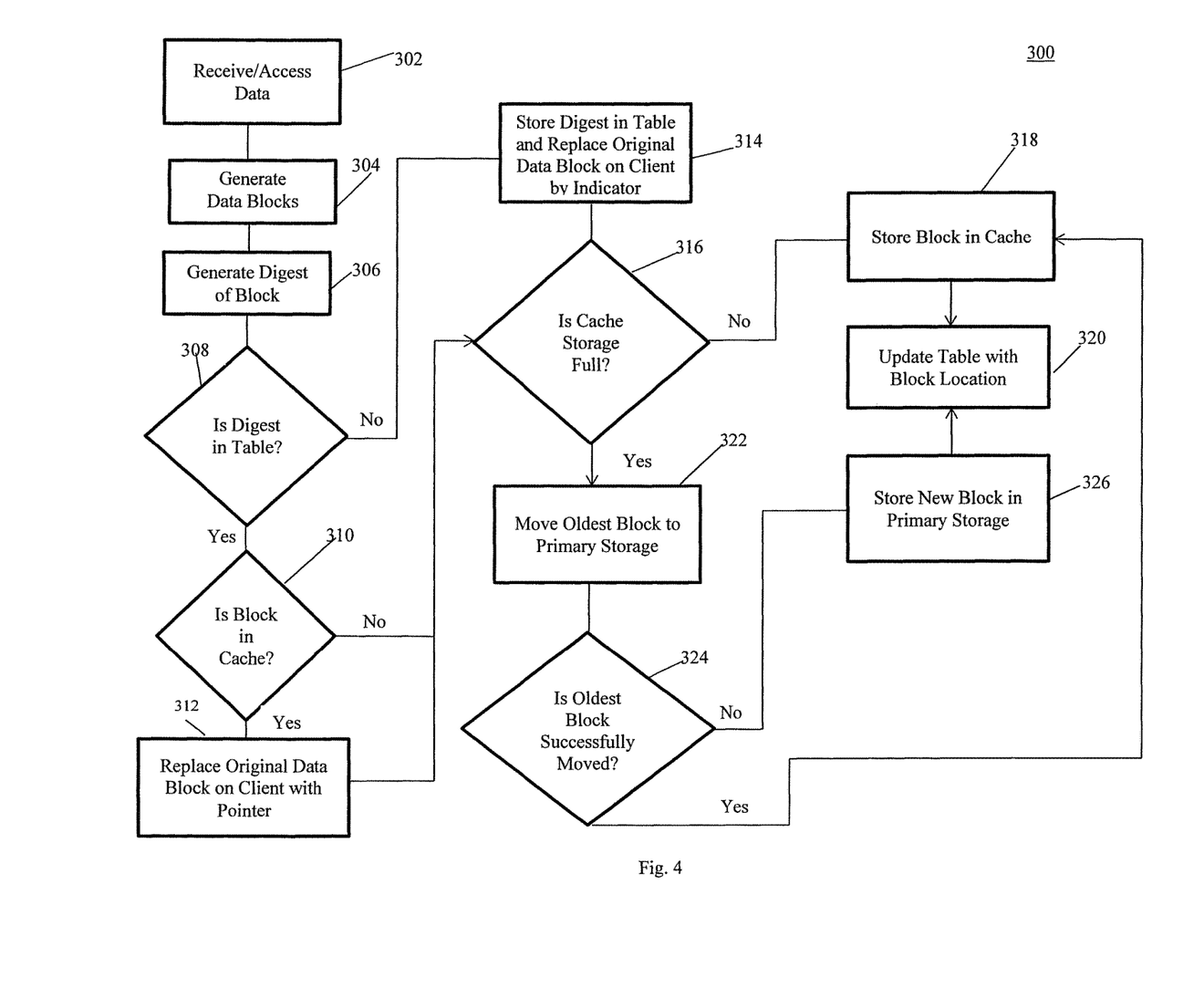
FIG. 4 is a flowchart of an example of a deduplication routine to backup in selected storage devices in the data processing environment of FIG. 1, including cache storage for rapid retrieval, in accordance with an embodiment of the invention.

FIG. 4 is a flow chart of an example of a method of storing deduplicated data blocks in the data processing system 100 of FIG. 1, in accordance with an embodiment of the invention. The method may be performed by the deduplication system 140, under the control of the processor 142 and control module 174, for example. In this example, the control module 174 and the processor 142 of the deduplication system 140 are configured to operate based on the assumption that the most recently deduplicated data blocks are most likely to be requested (restored, retrieved, read, and/or written to) by client machines 110, 112, 114. In other examples, other prioritized query methods based on other factors, such as those discussed above, may applied.

In Step 302, data is received from or accessed at a respective client machine 110-114, such as the client machine 110, for example. The control module 174 divides the data in each file into blocks of a fixed or variable size, using the memory 144 to store the blocks, for example, in Step 304. The control module 174 generates message digests (hash values) of the blocks stored in the memory 144, in Step 306. The message digests may be generated by a substantially collision free algorithm, for example, as discussed above.

The control module 174 determines whether the message digest of a currently deduplicated data block is already stored in the hash table 200, in Step 308, by comparing the hash value of that data block to the digest values 202 already stored by the deduplication system 140 in the hash table 200, for example.

In this example, if the digest value of a current data block is already stored in the hash table 200, which indicates that an identical data block has already been deduplicated and stored, it is determined whether the current data block is already stored in the cache 148, in Step 310. The cache 148 may comprise one or more SSDs, for example, from which data may be retrieved faster than the other storage devices used by the deduplication system 140. The cache 148 may comprise other types of storage devices that are faster than the primary storage device 146 and/or the external storage 147, for example. The control module 174 in this example may determine that the data block is stored in the cache 148 based on searching of the hash table 200 or a directory of the cache, or by other methods known in the art, for example.

If the current data block is already stored in the cache 148 (Step 310), in this example the processor 142 causes the current data block to be replaced by a stub file on the client machine. The stub file in this example contains an indicator to the location of the already stored data block in the cache 148 or primary/external storage 146 and may also include the message digest (hash value) of the block, although that is not required. The hash table 200 may be updated by the processor 142 or the control module 174 to include the location of the newly deduplicated data block on the client machine 110, 112, 114 from which the current data block was originally stored, in association with the hash value, if such information is maintained in column 204, for example.

If it is determined in Step 310 that the current data block is not already stored in the cache 148, in Step 310 the control module 174 determines whether the cache is full, in a manner known to the art. For example, the processor 142 or the control module 148 may keep track of the filling of the cache 148 so that the processor or control module can determine whether there is available room in the cache. If the processor 142 stores such information, then the control module 148 may send a message to the processor 142 asking whether there is room in the cache for the current data block.

If the message digest of the current data block is not stored in the hash table 200 and the cache 148 is not full, then the current data block is stored in the cache by the control module 174, in Step 318. The hash table 200 may then be updated by the control module 174 to indicate the location 208 of the current data block in the cache 148, in association with the message digest (hash value) of the data block, in Step 320. Optionally, the date the data block is stored in the cache 148 may also be stored in the hash table 200, such as in the metadata 208, for example, as discussed above. The time the data block was stored may also be stored in the hash table 200. The date and time data blocks are stored may also be stored in another location.

If the control module 174 determines that the cache 148 is full in Step 316, then, in this example, where a FIFO method is used, the oldest data block in the cache (the data block stored for the longest period of time) is moved by the control module 74 or the processor 142 to the primary storage 146, in Step 322. The oldest data block may be identified based on metadata 208 in the hash table 200 and/or the directory of the cache 148, which may identify when each block is stored in the cache, for example. It is noted that while the cache 148 is being referred to as "full," the SSD in the cache may not be full, but the empty space may not be available for storage. This is because SSDs may maintain extra storage that is not available for storage of new data to maintain write performance, as is known in the art. As discussed above, if a modified FIFO or prioritized queuing methods is used, the oldest date block is not necessarily removed.

If the processor 142 determines that the oldest data block or blocks (depending on the size of the incoming data block) has been successfully moved to the primary storage 146, then the current data block is moved to the cache 148, in Step 318 and the hash table 200 is updated to indicate the current location 206 in Step 320, as discussed above. The indicator(s) in the stub file(s) corresponding to the original data blocks may also be updated to point to the new location of the data block, by the deduplication system 140, via an agent, for example.

If the processor 142 determines that the oldest data block has not been successfully moved, then the current data block is stored in the primary storage 146 or the external storage 147, in Step 326 because there is no room in the cache 148.

Returning to Step 308, if it is determined that the message digest is not already in the hash table 200, then a data block identical to the current data block has not already been received or accessed for deduplication. In this case, the message digest is stored in the hash table 200, along with an indicator to the location 206 of the corresponding data block in the cache 148 and the location 204 of the data block on the client, in Step 314. The method 300 proceeds to Step 316 and continues, as discussed above.

As discussed above, instead of always storing the currently received data block in the cache 148 in Step 318, if it is not already stored there, one or more other factors may be taken into consideration in determining whether to store a currently received data block in the cache or in the primary storage 146. For example, only data blocks received from a particular one or a few of the client machines 110, 112, 114 may be stored in the cache 148. In another example, data blocks stored in more than a predetermined number of locations on the client machine 110, 112, 114 sending the data block for deduplication, may be stored in the cache 148. In another example, data blocks received from a particular storage location on a respective client machine 110, 112, 114, such as from a particular drive, for example, may be stored in the cache 148. As discussed herein, the processor 142 and/or the control module 174, under the control of an algorithm stored in the disk storage 144c, for example, may determine whether to store the current deduplicated data block in the cache 148 or the primary storage 146, based on two or more factors. The algorithm may include weightings for respective factors.

In addition, as described above, in other examples, the oldest data block may not be moved out of the cache 148 to make room for a current data block. One or more other factors may be considered in addition to or instead of moving the oldest data block. The flowchart 300 of FIG. 4 may be readily modified by one of ordinary skill in the art to apply one or more other factors in determining whether to store a current data block in the cache 148 and to determine which data block in the cache to move out of the cache. As discussed herein, the processor 142 and/or the control module 174, under the control of algorithms stored in the disk storage 144c, for example, may determine data block in the cache 148 to move out of the cache 148 when necessary to make room for a new data block, based on two or more factors. The algorithm may include weightings for respective factors.

As discussed above, respective client machines 110, 112, 114 may instruct the deduplication system 140 to use particular criteria to determine whether to store a particular type of data block in the cache 148 and/or to move a particular type of data block from the cache, when necessary. Options may be presented in the GUI, for example, as discussed above, during a set up procedure or registration procedure with the deduplication system 140 or at a later time, for example.

Figure 5:
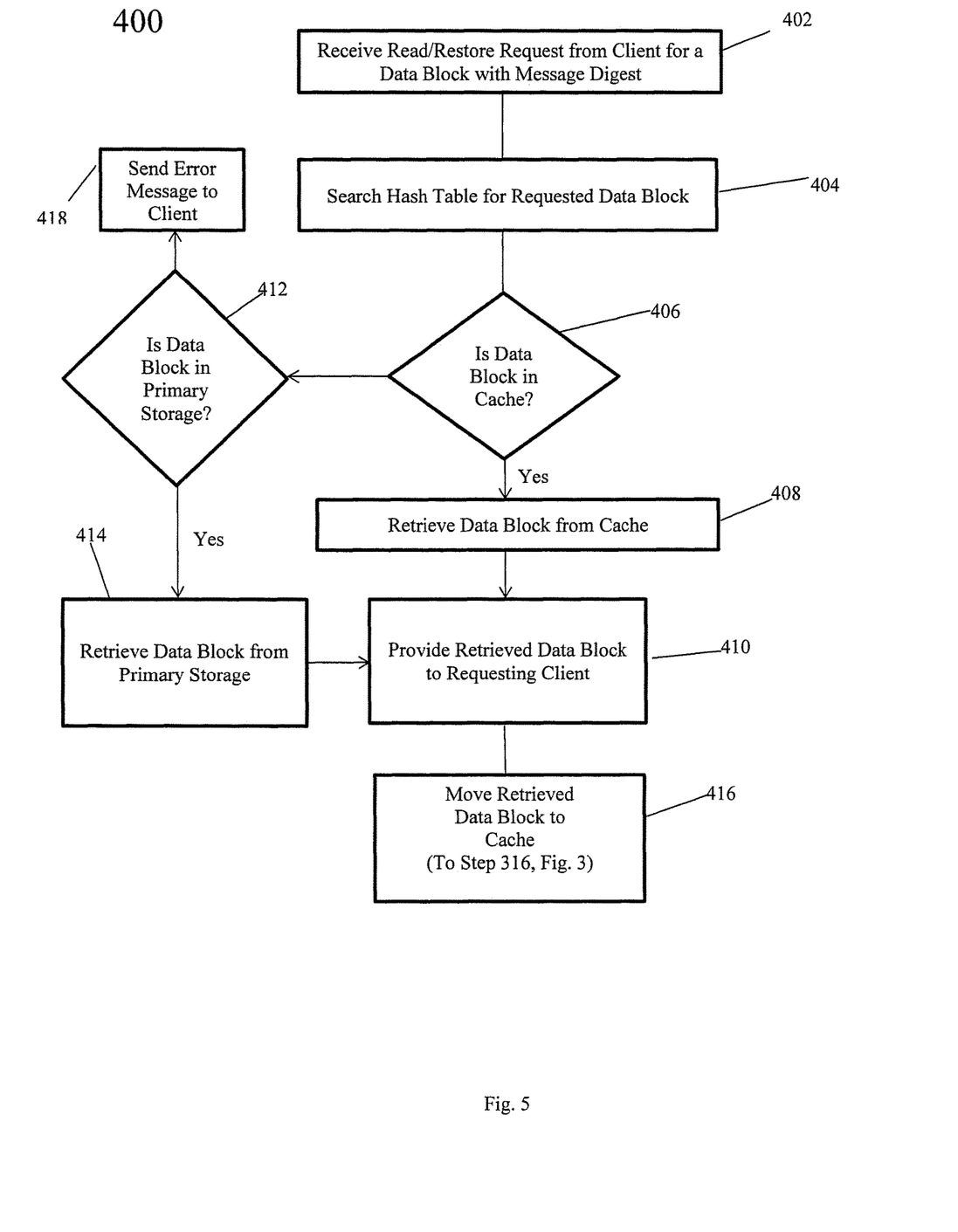
FIG. 5 is a flowchart of an example of a method of retrieving deduplicated data in the deduplication system of FIG. 1, in accordance with an embodiment of the invention.

FIG. 5 is a flowchart of an example of a method 400 for retrieval of a deduplicated data block by the processor 142 of the deduplication system 140 in response to a request from a client machine 110, 112, 114, such as the client machine 110, for example. The request may be a restore, read, or write request, for example. The request is received by the interface 172 of the deduplication system 140 from a client machine 110, 112, 114, via the network 120, in Step 402. The request may include the message digest of the data block, if it was included in the stub file. The control module 174, for example, may search the hash table 200 for a matching message digest. If there is a match, the control module 174 identifies the storage location of the data block corresponding to the message digest, in column 206, for example. Alternatively, the data block may be located on the client machine 110, 112, 114 through a directory that includes the message digest, or a pointer to the data location in the stub file, for example.

If it is determined that the data block location is in the cache 148, in Step 406, the data block is retrieved, in Step 408, and provided to the requesting client machine 110, in Step 410, by the interface 172 over the network 122. The metadata 208 associated with the hash value of the data block in the hash table 200 may be updated to indicate the date/time of the current request.

If it is determined that the requested data block is not in the cache 148, in Step 406, then it is determined whether the data block is in the primary storage 146 in Step 412.

If it is determined in Step 412 that the data block is present in the primary storage 146, for example, the block is retrieved by the processor 142, in Step 414, and provided to the requesting client machine 110 via the interface 172 and the network 120, in Step 410.

In this example of a FIFO method, it is assumed that the most recently requested data block is most likely to be requested again. The processor 142 therefore attempts to transfer the data block to the cache 148, in Step 416, by proceeding to Step 316 of the method 300 to determine whether there is room in the cache. The method 300 then proceeds through Steps 316-326, as discussed above, by the processor 142, for example.

If it is determined that the data block is not in the primary storage 142 in Step 412, then an error has occurred and a read error message is provided to the client machine, in Step 418.

It will be appreciated by those skilled in the art that changes may be made to the embodiments described herein, without departing from the spirit and scope of the inventions, which are defined by the following claims.

I claim:

1. A method of deduplicating data by a system having a first storage device and a second storage device to store deduplicated data, wherein data is retrievable from the first storage device faster than data is retrievable from the second storage device, the method comprising:
   receiving data for deduplication from a client machine, by the deduplication system;
   deduplicating the received data;
   determining whether to store the deduplicated data in the first storage device or the second storage device based, at least in part, on a characteristic of the client machine; and
   storing the deduplicated data in the determined first storage device or second storage device.

2. The method of claim 1, wherein:
   the first storage device comprises a non-spinning storage device; and
   the second storage device comprises a spinning storage device.

3. The method of claim 2, wherein the non-spinning storage device comprises a solid state drive storage device.

4. The method of claim 1, comprising:
   determining that the deduplicated data is to be stored in the first storage device; and
   storing the deduplicated data in the first storage device.

5. The method of claim 4, further comprising, after determining that the deduplicated data is to be stored on the first storage device:
   determining whether the first storage device is full; and
   if the first storage device is full, moving a data block from the first storage device to the second storage device.

6. The method of claim 5, comprising:
   selecting a data block to move to the second storage device based, at least in part, on one or more of the following factors:
   how long a data block has been in the first storage device;
   how long a data block has been in the first storage device without being requested;
   a number of past requests for each data block;
   a probability that a respective data block will be requested;
   types of requests for respective data blocks;

a number of times respective data blocks have been received for deduplication from more than one client machine;
a location of respective data blocks on the client machine;
a number of locations of the same data block on the client machine providing the data of the data block for duplication; and/or
an identity of the client machine providing the data of the data block for deduplication.

7. The method of claim 6, comprising selecting the data block to move to the second storage device based, at least in part, on two or more of the factors, by applying an algorithm including respective weightings for each of the two or more of the factors.

8. The method of claim 1, comprising determining whether to store the deduplicated data in the first storage device or the second storage device based, at least in part, on one or more of the following characteristics of the client machine:
a location of the data on the client machine;
a number of locations of the same data on the client machine; and/or
the identity of the client machine.

9. The method of claim 8, further comprising determining whether to store the deduplicated data in the first storage device or the second storage device based, at least in part, on the data received data for deduplication.

10. The method of claim 1, wherein deduplicating the data comprises:
generating a digest of the received data;
determining whether the digest is in a table of digests maintained by the system;
if it is determined that the digest is not in the table, storing the digest in the table; and
replacing the received data on the client machine by a stub file.

11. The method of claim 1, further comprising:
receiving a request from a client machine for deduplicated data;
determining a location of the requested deduplicated data; and
if the data is in the second storage device:
retrieving the data;
providing the data to the client machine; and
moving the retrieved data to the first storage device.

12. The method of claim 11, wherein the request for deduplicated data includes a message digest of the deduplicated data, the method further comprising:
determining the location of the requested deduplicated data based, at least in part, on the message digest.

13. The method of claim 12, comprising determining the location of the requested deduplicated data by checking a table correlating message digests with locations of data corresponding to the message digest on the first and second storage devices.

14. The method of claim 11, further comprising, prior to moving the retrieved data to the first storage device:
determining whether the first storage device is full; and
if the first storage device is full, moving a data block from the first storage device to the second storage device prior to moving the retrieved data to the first storage device.

15. The method of claim 14, further comprising selecting a data block to move to the second storage device based, at least in part, on:

how long a data block has been in the first storage device;
how long a data block has been in the first storage device without being requested;
a number of past requests for each data block;
a probability that a respective data block will be requested;
types of requests for respective data blocks;
a number of times respective data block have been received for deduplication from more than one client machine;
a location of respective data blocks on a client machine providing the data of the data block for deduplication;
a number of locations of the same data block on the client machine providing the data of the data block for deduplication; and
an identity of the client machine providing the data of the data block for deduplication.

16. The method of claim 15, comprising selecting the data block by applying an algorithm including respective weightings for the one or more of the factors.

17. A method of deduplicating data by a deduplication system having a first, solid state storage device and a second storage device to store deduplicated data, wherein data is retrievable from the first, solid state drive storage device faster than data is retrievable from the second storage device, the method comprising:
receiving data for deduplication from a client machine, by the deduplication system;
deduplicating the received data;
determining whether the deduplicated data is stored in the first, solid state storage device; and
if the deduplicated data is not stored in the first, solid state storage device, always storing the deduplicated data in the first, solid state storage device.

18. The method of claim 17, further comprising, after determining that the received data is to be stored on the first storage device:
determining whether the first storage device is full; and
if the first storage device is full, moving a data block from the first storage device to the second storage device.

19. A deduplication system comprising:
a first storage device to store data;
a second storage device to store deduplicated data, wherein data is retrievable from the first storage device faster than data is retrievable from the second storage device; and
a processing device configured to:
receive data for deduplication, by the system;
deduplicate the received data;
determine whether to store the deduplicated data in the first storage device or the second storage device, based, at least in part, on a characteristic of the client machine; and
store the deduplicated data in the determined first storage device or second storage device.

20. The system of claim 19, wherein:
the first storage device comprises a non-spinning storage device; and
the second storage device comprises a spinning storage device.

21. The system of claim 19, wherein the first storage device comprises a solid state drive storage device.

22. The system of claim 19, wherein the second storage device comprises a disk drive or a tape drive.

23. The system of claim 19, wherein the processing device is configured to:
determine that the deduplicated data is to be stored in the first storage device; and
store the received data in the first storage device.

24. The system of claim 19, wherein the processing device is further configured to determine whether to store the deduplicated data in the first storage device or the second storage device based, at least in part, on one or more of the following characteristics of the client machine:
- a location of the data on the client machine;
- a number of locations of the same data on the client machine; and/or
- an identity of the client machine.

25. The system of claim 24, wherein the processing device is further configured to determine whether to store the deduplicated data in the first storage device or the second storage device based, at least in part, on the received data.

26. The system of claim 19, wherein the processing device is further configured to:
- prior to moving the deduplicated data to the first storage device;
- determine whether the first storage device is full; and
- if the first storage device is full, move a data block from the first storage device to the second storage device prior to moving the retrieved data to the first storage device.

27. The system of claim 26, wherein the processing device is further configured to select a data block to move to the second storage device based, at least in part, on two or more of the following factors:
- how long a data block has been in the first storage device;
- how long a data block has been in the first storage device without being requested;
- a number of past requests for each data block;
- a probability that a respective data block will be requested;
- types of requests for respective data blocks;
- a number of times respective data blocks have been received for deduplication;
- a location of respective data blocks in the client machine providing the data of the data block for deduplication;
- a number of locations of the data on the client machine providing the data of the data block for deduplication; and/or
- an identity of the client machine providing the data of the data block for deduplication.

28. The system of claim 27, wherein the processing device is configured to select the data block to move by applying an algorithm including respective weightings for the two or more of the factors.

29. The system of claim 19, wherein:
the processing device is further configured to:
receive a request from a client machine for deduplicated data;
determine a location of the requested deduplicated data; and
if the data is in the second storage device:
retrieve the data;
provide the data to the client machine; and
move the retrieved data to the first storage device.

30. The system of claim 29, wherein:
the first storage device comprises a non-spinning storage device; and
the second storage device comprises a spinning storage device.

31. The system of claim 30, wherein the first storage device comprises a solid state storage device.

32. The system of claim 30, wherein the request for deduplicated data comprises a message digest of the deduplicated data and the processing device is configured to determine the location by:
checking a table correlating message digests with locations of data with the first and second storage devices.

33. The system of claim 30, wherein the processing device is further configured to:
determine whether the first storage device is full; and
if the first storage device is full, move a second data block from the first storage device to the second storage device prior to moving the retrieved data block to the first storage device.

34. The system of claim 33, wherein the processing device is further configured to select the data block to move to the second storage device based, at least in part, on two or more of the following factors:
- how long a data block has been in the first storage device;
- how long a data block has been in the first storage device without being requested;
- a number of past requests for each data block;
- a probability that a respective data block will be requested;
- a number of times respective data blocks have been received for deduplication;
- types of requests for respective data blocks in a predetermined time period;
- a location of respective data blocks in the client machine providing the data block for deduplication;
- a number of locations of the data on the client machine; and/or
- an identity of the client machine providing the data of the data block for deduplication.

35. The system of claim 34, wherein the processing device is configured to select the data block by applying an algorithm including respective weightings for the two or more of the factors.

* * * * *